March 5, 1968  R. NEUSCHOTZ  3,371,402
TOOL FOR EXPANDING THREADED INSERT
Filed Sept. 21, 1965
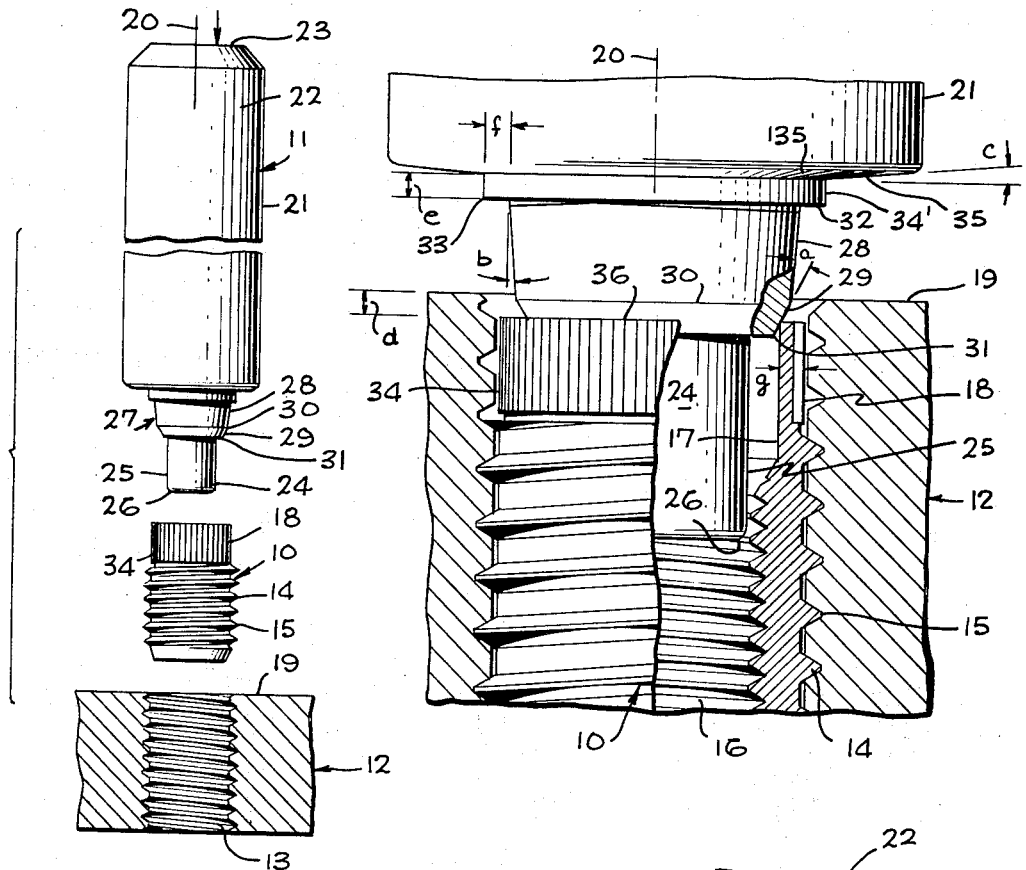
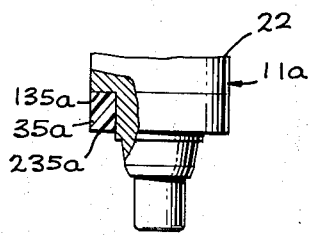
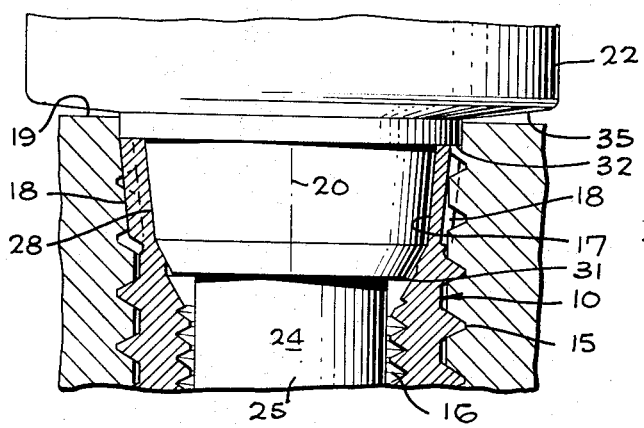
ROBERT NEUSCHOTZ
INVENTOR.
BY William P. Green
ATTORNEY

United States Patent Office 3,371,40[2]
Patented Mar. 5, 196[8]

3,371,402
TOOL FOR EXPANDING THREADED INSERT
Robert Neuschotz, 1162 Angelo Drive,
Beverly Hills, Calif. 90210
Filed Sept. 21, 1965, Ser. No. 488,934
12 Claims. (Cl. 29—243.52)

ABSTRACT OF THE DISCLOSURE

A tool for installing within a carrier part a threaded insert having a radially expansible locking portion. The tool has an expanding portion with a first external surface tapering at a first angle of between about 1 and 10 degrees, and a second external surface axially inwardly beyond the first surface and tapering at an angle of between about 20 and 45 degrees, with the two surfaces meeting each other at an annular edge at which the angle of taper changes abruptly. Two stop shoulders are provided on the tool axially outwardly of the expanding portion, and a reduced dimension pilot portion is provided axially inwardly of the expanding portion.

---

This invention relates to improved tools for expanding a locking portion of a threaded element to a condition in which it retains the element against removal from an associated carrier part. The tool may typically be utilized for expanding a threaded element of the type disclosed in my copending application Ser. No. 402,379, filed Oct. 8, 1964, on "Threaded Insert Having Expandable Serrated Locking Portion," now Patent No. 3,220,454, issued Nov. 30, 1965.

My above identified application shows a threaded element preferably taking the form of an internally and externally threaded insert, and which is screwed into mating threads in a carrier part. This element has a generally tubular locking portion presenting external serrations or irregularities, and which locking portion is expansible radially outwardly to force the serrations against the threads of the carrier part to thereby lock the element against unscrewing rotation relative to the carrier part. Other somewhat similar inserts have been devised previously which have also had tubular expansible portions but in which the serrations are received within and engageable with a counterbore surface formed in the carrier part, rather than directly contacting threads within that part.

To expand the locking portions of elements of this type, there have in the past been provided tools which are capable of being driven axially within and relative to the installed elements, and which have expander portions engaging the inner surface of the tubular locking portion, and progressively expanding that portion radially outwardly as the tool is driven axially. These tools, though satisfactory in some respects, have had certain decided disadvantages which have limited the effectiveness of the expanding operation, and have unnecessarily increased the cost of the tools. One such disadvantage has involved the difficulty of accurately forming the previously devised tools in a manner properly controlling and predetermining the axial depth or axial extent through which the wall of the locking portion will be expanded. The axially inner end of the expander portion of the tool has been shaped as a rounded annular expanding edge, which, as it advances axially inwardly, progressively cams or forces the side wall of the tubular locking portion of the element radially outwardly, until that rounded inner end of the expanding portion reaches the limits of its travel. When the tool reaches that innermost position, the rounded end of the expander portion of the tool leaves a correspondingly rounded or curved surface defining the inner extremity of the expanded portion of the threaded ele[ment], which rounded surface is not as effectively localize[d] as would be desired, and whose position can not be a[s] effectively predetermined as would be desired. It is ver[y] difficult to accurately form a rounded surface of thi[s] type on the expander tool, and to attain precision in it[s] formation to an extent enabling accurate predetermina[-]tion of the axial depth through which the locking por[-]tion will be expanded. As will be understood, any varia[-]tion in the axial extent of the expanded portion of th[e] insert will correspondingly and undesirably alter the lock[-]ing effectiveness of the device.

A major object of the present invention is to provid[e] an improved expander tool which is easier to manufac[-]ture than the rounded end type of expander element discussed above, and which in addition is more precise an[d] predeterminable in its expanding operation. As will appear a tool embodying the invention is so constructed tha[t] the axially inner extremity of the expanded portion o[f] the threaded element is highly localized, rather than being spread over as great an axial extent as occurs when the leading end of the device is rounded. Further, the structure of the tool is such that this localized inner extremity of the main expanding portion may be controlled within closer limits during manufacture of the tool, so that the tool may be more reliable than a rounded device in expanding an insert or other threaded element in precisely the manner desired for attaining optimum locking characteristics.

Structurally, these results are attained by forming the expander portion of the tool to have two outer surfaces meeting at an edge which is very abrupt (as viewed in axial section) rather than meeting at a rounded surface, so that this abrupt edge may be located precisely, and thereby predetermine precisely the innermost extremity of the main expanded area. A first of these surfaces may taper at a first fairly substantial angle with respect to the axis of the device, while the second surface may be more directly axial, but preferably is itself also tapered to facilitate removal of the tool from the insert after expansion, though this taper of the second surface is relatively slight as compared with the angularity of the first surface.

An additional object of the invention is to so construct the tool as to more positively determine the point at which the axially inward motion of the tool relative to the insert or other element is halted. Desirably, this limitation of the inward movement is attained by engagement of a stop-shoulder with an outer end surface of the insert. An additional shoulder may be provided on the tool body for engaging the carrier part about the insert.

The above and other features and objects of the invention will be better understood from the following detailed description of the typical embodiments illustrated in the accompanying drawing, in which:

FIG. 1 is an exploded side view illustrating a tool embodying the invention, an insert to be installed by the tool, and a carrier part within which the insert is to be installed;

FIG. 2 is an enlarged fragmentary representation of the tool, insert, and carrier part, prior to an expanding operation;

FIG. 3 is a view similar to FIG. 2, but showing the tool and insert after expansion of the locking portion of the insert; and FIG. 4 illustrates a variational form of the tool.

Referring first to FIG. 1, I have shown at 10 a threaded insert which is to be installed by tool 11 within a carrier part 12 having internal threads 13. The insert 10 may be of the type shown in my copending application Ser. No. 402,379. More particularly, this insert may have an essentially tubular metal body 14, having external threads 15 adapted to be screwed into and mate with internal threads 13 of the carrier part. Internally, the insert may have additional threads 16 which are to engage a screw, after installation of the insert, to connect the screw to the carrier part through the medium of the insert. Axially, outwardly of internal threads 16, the insert body contains a counterbore 17, which may be cylindrical. The axially outer portion of insert 10 which contains counterbore 17 may be considered as an annular locking portion of the device, and for this purpose has on its outer surface a series of circularly spaced desirably axially extending serrations 18, which are preferably of a diameter small enough to be received within the minor diameter of threads 13 in the carrier part, so that the insert may be screwed into the carrier part to the position illustrated in FIG. 2 without substantial interference being offered by the serrations 18. The outer surface 19 of the carrier part may be planar, and be disposed transversely of the main axis 20 of the carrier part threads 13, and installed insert 10.

To now describe the expanding tool 11, it is noted that this tool may be considered as being elongated along the previously mentioned axis 20, and as having an external surface 21 which is typically cylindrical and centered about axis 20. At its upper or axially outer end, the typically one-piece body 22 of tool 11 may have a transverse end surface 23, which is adapted to be contacted by a hammer for driving the insert downwardly as viewed in FIGS. 1 and 2.

At its lower or axially inner end, tool body 22 may have a pilot portion 24, having an outer typically cylindrical surface 25 of a diameter corresponding approximately to and adapted to be received within the minor diameter of internal threads 16 of the insert. This pilot portion 24 may have an annular rounded leading end surface 26, which like surface 25 is centered about axis 20, to facilitate proper centering of pilot portion 24 within internal threads 16 of the insert prior to and during an expanding operation.

Axially outwardly of or above pilot portion 24, the tool body 22 has an expander portion 27 which presents two external annular surfaces 28 and 29, both centered about axis 20, and meeting one another at an annular abrupt edge 30, also disposed and centered about axis 20. Surface 29 is desirably frusto-conical in shape, and tapers progressively toward axis 20 as surface 29 advances axially inwardly from edge 30 to the circular inner edge 31 of surface 29. The angle of taper $a$ of this surface 29 relative to axis 20 is very substantial, preferably being between about 20 and 45 degrees, but desirably not greater than about 45 degrees. In most instances, this angle is approximately 30 degrees.

Surface 28 of expander portion 27 of the tool extends more directly axially than does surface 29, but preferably is also frusto-conical and tapers to a reduced diameter as it advances axially inwardly or downwardly in FIG. 1. The angle of taper $b$ of surface 28 with respect to axis 20 is much smaller than the angle of taper $a$ of surface 29, and is preferably between about one and ten degrees, for best results between about two and five degrees. Stated differently, it is desirable in most instances that the angle $a$ be at least several times (at least three times) as great as angle $b$.

Surface 28 has an axial extent which corresponds approximately to, or is slightly less than, the axial extent of counterbore 17 of the insert. At the upper end of surface 28, tool body 22 has a transverse annular stop-shoulder 32, which is desirably centered about and disposed directly normal to axis 20, and extends radially outwardly to an outer edge 33 having a diameter corresponding substantially to the maximum diameter of the serrated locking portion 34 of the insert after expansion. From edge 33, the outer surface of the tool body may extend directly axially at 34', to form a short cylindrical surface centered about axis 20, and to a location 135 from which the surface of the tool body extends approximately radially outwardly to form an annular second stop surface 35. This surface 35 may advance gradually axially outwardly as it advances radially outwardly, at a slight inclination represented by the angle $c$ of FIG. 2, which angle may typically be between about one and ten degrees, preferably approximately five degrees.

The body 22 of the tool 11 may be formed of any appropriate rigid material, capable of satisfactorily deforming the locking portion 34 of the insert without damage to the tool. For example, the tool may be formed of a single piece of steel, which may be hardened at least at its lower expanding end.

To now describe the manner of use of the tool, first of all assume that the insert 10 has been screwed by appropriate means (not shown) to the FIG. 2 position of installation within threaded passage 13 of the carrier part 12. Desirably, the insert is set at a position in which its outer annular end surface 36 is inset slightly inwardly beyond outer surface 19 of the carrier part, to a depth represented at $d$ in FIG. 2. This depth $d$ may be equal to or slightly less than the axial extent $e$ of cylindrical surface 34 of the tool.

After the insert has been screwed to the FIG. 2 position, tool 11 is inserted axially into the insert, with pilot portion 24 being received within and centered by internal threads 16 of the insert. The tool body is moved to a position in which its tapered surface 29 engages the upper end of counterbore 17, and with the parts in this position, tool 11 is driven downwardly from the FIG. 2 position to the FIG. 3 position by hammer strokes applied downwardly against the upper end surface 23 of the tool. As the tool is thus driven downwardly, tapered surface 29 progressively expands locking portion 34 radially outwardly, and does so annularly about the entire three hundred and sixty degree extent of locking portion 34 around axis 20. The upper slightly tapered surface 28 further expands the locking portion radially outwardly to a slightly greater extent, and maintains that portion in the gradually tapered condition of FIG. 3. As locking portion 34 is expanded radially outwardly, the serrations 18 on its outer surface are expanded outwardly against and into the upper turns of threads 13 of the carrier part, to cut across those threads and effectively lock the insert against unscrewing rotation. After the tool reaches the FIG. 3 position, it is withdrawn axially upwardly from the insert to leave the latter in its installed and locked condition.

As will be apparent from FIG. 3, the expansion of the locking portion continues axially inwardly or downwardly within that portion of the lowest point reached by edge 30 of the tool during the driving operation. In order to assure accurate predetermination of the point at which this edge 30 forms the lower extremity of the primary expanded portion of the insert, surfaces 28 and 29 are shaped to meet at edge 30 very abruptly, and without substantial rounding (preferably without any rounding) of the edge 30 as that edge appears in axial cross section (for instance, as seen in FIG. 2). Stated differently, the conical tapering angularities of the two surfaces 28 and 29 continue to the point at which they actually meet one another at edge 30. It is found that the provision of this abrupt edge 30 results in a far more accurate expansion operation than can be attained effectively if a rounded edge is provided at the same location.

The diameter of lower edge 31 of surface 29 is desirably slightly smaller than the initial internal diameter of counterbore 17, while the diameter of the above discussed edge 30 formed at the puncture of surfaces 28 and 29 is greater than the initial internal diameter of counterbore 17, to attain the desired expanding function. Also, the entire surface 28 is of course preferable initially of a diameter greater than the starting diameter of counterbore 17 of the insert, and the radial extent $f$ of surface 32 is preferably approximately equal to the radial extent $g$ of the upper surface 36 of the insert.

When the tool reaches its FIG. 3 lowermost position, stop-shoulder 32 of the tool body engages the upper end surface 36 of the insert to limit the tool motion relative to the insert at that position. The user notices the increased resistance to downward driving motion of the tool which occurs when shoulder 32 engages the insert, and thus is apprised when the expanding operation has been completed. Surface 35 of the tool may in this position be spaced very slightly above the outer surface 19 of the carrier part, to normally avoid contact with that carrier part, but may be engageable with surface 19 if the tool is driven downwardly slightly farther to assure against damage to the insert, and make certain that the tool is ultimately halted by the carrier part itself. The taper of surface 35 prevents excessive marking of the outer surface 19 of the carrier part even if such engagement of surface 35 with that surface 19 does occur. The slight tapering angularity of surface 28 facilitates ultimate withdrawal of the tool from the insert, after the expanding operation, and without binding of the tool within the expanded locking portion of the insert.

FIG. 4 shows fragmentarily a slightly variational form of tool 11a embodying the invention, which tool may be considered as identical with that of FIGS. 1 to 3 except for the provision of an annular stop-ring 35a formed of nylon or other slightly resilient material, and received within an annular recess 135a formed in the axially inner end of the enlarged portion of the tool body 22. This ring 35a may have an inner surface 235a positioned to engage the carrier part and limit axially inward movement of the tool body, with the deformable characteristics of ring 35a serving to prevent marking of the outer surface of the carrier part.

I claim:

1. A tool for installing in a passage within a carrier part a fastener part having external threads for engaging said carrier part and having additional threads for engaging another member, said fastener part having a radially expansible generally tubular locking portion centered about an axis with locking irregularities on its outer surface, said tool including a body structure having an expanding portion adapted to project into said locking portion of the fastener part and to be driven axially inwardly relative thereto along said axis and constructed to expand said locking portion upon said axially inward movement, said expanding portion having a first external surface tapering at a first angle of between about 1 and 10 degrees toward said axis, and having a second external surface axially inwardly beyond said first surface and tapering at a second and much greater angle of between about 20 and 45 degrees toward said axis, said two tapering surfaces meeting one another at, and defining, an edge which extends essentially annularly about said axis and which is positioned to internally engage and progressively expand said locking portion and at which the angle of taper changes abruptly from said first angle to said second angle without substantial rounding of said edge as seen in axial cross section.

2. A tool as recited in claim 1, in which said first angle of taper is between about 2 and 5 degrees.

3. A tool as recited in claim 1, in which said first angle of taper is between about 2 and 5 degrees, and said second angle of taper is approximately 30 degrees.

4. A tool for installing in a passage within a carrier part a fastener part having external threads for engaging said carrier part and having additional threads for engaging another member, said fastener part having a radially expansible generally tubular locking portion centered about an axis with locking irregularities on its outer surface, said tool including a body structure having an expanding portion adapted to project into said locking portion of the fastener part and to be driven axially inwardly relative thereto along said axis and constructed to expand said locking portion upon said axially inward movement, said expanding portion having a first external surface tapering at a first angle of between about 1 and 10 degrees toward said axis, and having a second external surface axially inwardly beyond said first surface and tapering at a second and much greater angle of between about 20 and 45 degrees toward said axis, said two tapering surfaces meeting one another at, and defining, an edge which extends essentially annularly about said axis and which is positioned to internally engage and progressively expand said locking portion and at which the angle of taper changes abruptly from said first angle to said second angle without substantial rounding of said edge as seen in axial cross section, and a pilot carried by said body structure and projecting axially inwardly beyond said tapering surfaces and of a diameter smaller than said tapering surfaces.

5. A tool for installing in a passage within a carrier part a fastener part having external threads for engaging said carrier part and having additional threads for engaging another member, said fastener part having a radially expansible generally tubular locking portion centered about an axis with locking irregularities on its outer surface, said tool including a body structure having an expanding portion adapted to project into said locking portion of the fastener part and to be driven axially inwardly relative thereto along said axis and constructed to expand said locking portion upon said axially inward movement, said expanding portion having a first external surface tapering at a first angle of between about 1 and 10 degrees toward said axis, and having a second external surface axially inwardly beyond said first surface and tapering at a second and much greater angle of between about 20 and 45 degrees toward said axis, said two tapering surfaces meeting one another at, and defining, an edge which extends essentially annularly about said axis and which is positioned to internally engage and progressively expand said locking portion and at which the angle of taper changes abruptly from said first angle to said second angle without substantial rounding of said edge as seen in axial cross section, and a stop shoulder carried by the body structure axially outwardly of said tapering surfaces and disposed generally transversely of said axis and extending radially outwardly beyond and essentially about the tapering surfaces at a location to engage one of said parts in a relation limiting said axially inward movement of the tool structure.

6. A tool for installing in a passage within a carrier part a fastener part having external threads for engaging said carrier part and having additional threads for engaging another member, said fastener part having a radially expansible generally tubular locking portion centered about an axis with locking irregularities on its outer surface, said tool including a body structure having an expanding portion adapted to project into said locking portion of the fastener part and to be driven axially inwardly relative thereto along said axis and constructed to expand said locking portion upon said axially inward movement, said expanding portion having a first external surface tapering at a first angle of between about 1 and 10 degrees toward said axis, and having a second external surface axially inwardly beyond said first surface and tapering at a second and much greater angle of between about 20 and 45 degrees toward said axis, said two tapering surfaces meeting one another at, and defining, an edge which extends essentially annularly about said axis and which is positioned to internally engage and progressively expand said locking portion and at which the angle of taper changes abruptly from said first angle to said second angle without substantial rounding of said edge as seen in axial cross section, a pilot carried by said body structure and projecting axially inwardly beyond said tapering surfaces and of a diameter smaller than said tapering surfaces, and a stop shoulder carried by the body structure axially outwardly of said tapering surfaces and disposed generally transversely of said axis and extending radially outwardly beyond and essentially about the tapering surfaces at a location to engage one of said parts in a relation limiting said axially inward movement of the tool structure.

7. A tool for installing in a passage within a carrier part a fastener part having external threads for engaging said carrier part and having additional threads for engaging another member, said fastener part having a radially expansible generally tubular locking portion centered about an axis with locking irregularities on its outer surface, said tool including a body structure having an expanding portion adapted to project into said locking portion of the fastener part and to be driven axially inwardly relative thereto along said axis and constructed to expand said locking portion upon said axially inward movement, said expanding portion having a first external surface tapering at a first angle of between about 1 and 10 degrees toward said axis, and having a second external surface axially inwardly beyond said first surface and tapering at a second and much greater angle of between about 20 and 45 degrees toward said axis, said two tapering surfaces meeting one another at, and declining, an edge which extends essentially annularly about said axis and which is positioned to internally engage and progressively expand said locking portion and at which the angle of taper changes abruptly from said first angle to said second angle without substantial rounding of said edge as seen in axial cross section, and a stop shoulder carried by said body structure axially outwardly of said tapering surfaces and extending essentially transversely of said axis at a location to engage an end of said locking portion of the fastener part in a relation limiting said axial movement of the tool body structure.

8. A tool for installing in a passage within a carrier part a fastener part having external threads for engaging said carrier part and having additional theads for engaging another member, said fastener part having a radially expansible generally tubular locking portion centered about an axis with locking irregularities on its outer surface, said tool including a body structure having an expanding portion adapted to project into said locking portion of the fastener part and to be driven axially inwardly relative thereto along said axis and constructed to expand said locking portion upon said axially inward movement, said expanding portion having a first external surface tapering at a first angle of between about 1 and 10 degrees toward said axis, and having a second external surface axially inwardly beyond said first surface and tapering at a second and much greater angle of between about 20 and 45 degrees toward said axis, said two tapering surfaces meeting one another at, and defining, an edge which extends essentially annularly about said axis and which is positioned to internally engage and progressively expand said locking portion and at which the angle of taper changes abruptly from said first angle to said second angle without substantial rounding of said edge as seen in axial cross section, and a stop shoulder carried by said body structure axially outwardly of said tapering surfaces and extending essentially transversely of said axis at a location to engage an end of said locking portion of the fastener part in a relation limiting said axial movement of the tool body structure, there being a second essentially transverse surface carried by the body structure radially outwardly of and about said stop shoulder and spaced axially outwardly therebeyond, and a short essentially axial surface on the body structure extending between said stop shoulder and said second transverse surface.

9. A tool for installing in a passage within a carrier part a fastener part having external threads for engaging said carrier part and having additional threads for engaging another member, said fastener part having a radially expansible generally tubular locking portion centered about an axis with locking irregularities on its outer surface, said tool including a body structure having an expanding portion adapted to project into said locking portion of the fastener part and to be driven axially inwardly relative thereto along said axis and constructed to expand said locking portion upon said axially inwardly movement, said expanding portion having a first external surface tapering at a first angle of between about 1 and 10 degrees toward said axis, and having a second external surface axially inwardly beyond said first surface and tapering at a second and much greater angle of between about 20 and 45 degrees toward said axis, said two tapering surfaces meeting one another at, and defining, an edge which extends essentially annularly about said axis and which is positioned to internally engage and progressively expand said locking portion and at which the angle of taper changes abruptly from said first angle to said second angle without substantial rounding of said edge as seen in axial cross section, and an annular stop shoulder carried by said body structure axially outwardly of said tapering surfaces and extending substantially transversely of said axis at a location to engage an end of said locking portion of the fastener part in a relation limiting said axial movement of the tool body structure, there being a second annular essentially transverse surface carried by the body structure radially outwardly of and about said stop shoulder and spaced axially outwardly therebeyond, and disposed at a slight angle to a true transverse plane, and a short substantially cylindrical surface on the body structure extending between said stop shoulder and said second transverse surface.

10. A tool for installing in a passage within a carrier part a fastener part having external threads for engaging said carrier part and having additional threads for engaging another member, said fastener part having a radially expansible generally tubular locking portion centered about an axis with locking irregularities on its outer surface, said tool including a body structure having an expanding portion adapted to project into said locking portion of the fastener part and to be driven axially inwardly relative thereto along said axis and constructed to expand said locking portion upon said axially inward movement, said expanding portion having a first external surface tapering at a first angle of between about 2 and 5 degrees toward said axis, and having a second external surface axially inwardly beyond said first surface and tapering at a second and much greater angle of between about 20 and 45 degrees toward said axis, said two tapering surfaces meeting one another at, and defining, an edge which extends essentially annularly about said axis and which is positioned to internally engage and progressively expand said locking portion and at which the angle of taper changes abruptly from said first angle to said second angle without substantial rounding of said edge as seen in axial cross section, and an annular stop shoulder carried by said body structure axially outwardly of said tapering surfaces and extending substantially transversely of said axis at a location to engage an end of said locking portion of the fastener part in a relation limiting said axial movement of the tool body structure, there being a second annular essentially transverse surface carried by the body structure radially outwardly of and about said stop shoulder and spaced axially outwardly therebeyond, and disposed at a slight angle to a true transverse plane, a short substantially cylindrical surface on the body structure extending between said stop shoulder and said second transverse surface, and a substantially cylindrical pilot carried by said body structure and projecting axially inwardly beyond said tapering surfaces and of a diameter smaller than said tapering surfaces.

11. A tool for installing in a passage within a carrier part a fastener part having external threads for engaging said carrier part and having additional threads for engaging another member, said fastener part having a radially expansible generally tubular locking portion centered about an axis with locking irregularities on its outer surface, said tool including a body structure having an expanding portion adapted to project into said locking portion of the fastener part and to be driven axially inwardly relative thereto along said axis and constructed to expand said locking portion upon said axially inward movement, means forming a stop shoulder carried by said body structure axially outwardly of said expanding portion and extending essentially transversely of said axis at a location to engage primarily an end of said locking portion of the fastener part in a relation limiting said axial movement of the tool body structure, and means forming a second essentially transverse stop shoulder carried by the body structure radially outwardly of and about said first stop shoulder and spaced axially outwardly therebeyond for engaging said carrier part.

12. A tool as recited in claim 11, in which said second stop shoulder is disposed at a slight inclination to a true transverse plane, said first stop shoulder being disposed more directly transversely than the second stop shoulder.

References Cited

UNITED STATES PATENTS

| | | | |
|---|---|---|---|
| 2,120,067 | 6/1938 | Gray et al. | 29—157 |
| 3,119,435 | 1/1964 | Greenman | 29—243.52 |
| 3,296,765 | 1/1967 | Rohe et al. | 29—523 X |

THOMAS H. EAGER, *Primary Examiner.*